United States Patent [19]

Ackeret

[11] Patent Number: 5,715,978
[45] Date of Patent: Feb. 10, 1998

[54] DEVICE FOR VARIABLE DIVISION OF MOTOR VEHICLE BOOT AND SECURING LOADED GOODS

[75] Inventor: Peter Ackeret, Kuesnacht, Switzerland

[73] Assignee: fischerwerke Artur Fischer GmbH & Co. KG, Waldachtal, Germany

[21] Appl. No.: 637,324

[22] Filed: Apr. 22, 1996

[30] Foreign Application Priority Data

Apr. 20, 1995 [DE] Germany ............... 195 14 605.0

[51] Int. Cl.⁶ ............................ B60R 7/00; B60R 9/00; B60R 11/00
[52] U.S. Cl. ........................... 224/42.33; 224/42.34; 224/310; 224/311; 224/495; 224/498; 224/501; 224/502; 224/505; 224/925
[58] Field of Search ............................ 224/310, 311, 224/403, 495, 498, 501, 502, 505, 542, 925, 42.32, 42.33, 42.34; 211/12, 175, 184; 410/120, 129, 130, 133, 155

[56] References Cited

FOREIGN PATENT DOCUMENTS

| 4015556A1 | 11/1990 | Germany. |
|---|---|---|
| 9010940 U | 11/1990 | Germany. |
| 9109910 U | 1/1993 | Germany. |
| 4132954A1 | 4/1993 | Germany. |
| 4234812A1 | 4/1994 | Germany. |
| 2267876 | 12/1993 | United Kingdom. |

*Primary Examiner*—Henry J. Recla
*Assistant Examiner*—Timothy L. Maust
*Attorney, Agent, or Firm*—Michael J. Stricker

[57] ABSTRACT

A device for variable division of a motor vehicle boot and for securing the loaded goods has a guide rail arranged on the boot floor and one or more support panels guided by a sliding guide block in the guide rail at right angles to the guide rail and so as to be transversely displaceable therein. The support panels are mounted to rotate in the sliding block and can be swivelled up out of a horizontal position in which they lie substantially parallel to the boot floor, into a position vertical with respect to the boot floor, and can be locked. On the support panels there are provided connecting elements to which fixing modules or belt modules for securing the loaded goods or for dividing the boot in a second axis can be fixed.

22 Claims, 6 Drawing Sheets

DEVICE FOR VARIABLE DIVISION OF MOTOR VEHICLE BOOT AND SECURING LOADED GOODS

BACKGROUND OF THE INVENTION

The present invention relates to a device for the variable division of a motor vehicle boot and for securing the loaded goods.

Depending on the use to which the motor vehicle is put, the goods to be carried in the boot vary widely in respect of the number of individual items and their shapes and sizes. In particular in everyday use, often only relative small items, such as shopping bags, briefcases, etc. are carried in the boot, and take up only part of the boot space. Unsecured goods of this kind tend to slide around or even tip over in the boot as the vehicle is accelerated when moving off, braked, or driven round bends, which if the goods being transported are heavy or fragile, can easily lead to damage to the goods or even to the motor vehicle.

So-called "non-slip mats" are commercially available, which are placed on the floor of boot and are intended to prevent the goods being displaced during travel. Such "non-slip mats" are only effective for goods of certain shapes, sizes and weights, however, and only at relatively low acceleration values. Even with these "non-slip mats", the goods cannot be prevented from tipping over. Boot inserts are also commercially available, with which the boot can be divided fixedly or variably. These inserts essentially comprise a frame or a fixed base plate, which can be placed on the floor of the boot or secured thereto, on which divisions, such as dividing walls, wire brackets or similar constructions are arranged. These inserts either form fixed divisions, and are therefore suitable only for needs that always remain the same, such as exist, for example, in the professional field, or allow only a limited number of possible divisions of the space, and can be adapted only with considerable effort to the individual requirements, which often change quickly, and for those reasons are unsuitable for everyday use. When not in use, these inserts take up a relatively large amount of space, even when they are constructed to collapse or fold away, and therefore have to be taken out of the boot every time a larger space is required. Access to the spare wheel, which is usually housed in the floor of the boot, is frequently obstructed by such inserts, so that when changing a wheel first of all the insert has to be taken out of the boot.

SUMMARY OF THE INVENTION

Accordingly, it is an object of the present invention to provide a device for variable division of motor vehicle boot and securing loaded goods, which avoids the disadvantages of the prior art.

More particularly it is an object of the present invention to provide a device for the variable division of a motor vehicle boot and for securing the loaded goods, which device can be adapted quickly and smoothly to the particular requirements, and when not in use takes up minimum space in the boot.

The device according to the invention comprises a guide rail arranged in the region of the boot floor, and a support panel, which is guided by means of a sliding guide block in this guide rail at right angles to the guide rail and so as to be transversely displaceable therein, the support panel being mounted so as to rotate in the sliding guide block and being arranged to be swivelled up out of a horizontal position, in which it lies substantially parallel to the boot floor, into a position substantially vertical with respect to the boot floor.

The guide rail is preferably secured to the rear end (in the direction of travel) of the boot floor transversely to the direction of travel of the motor vehicle, and extends substantially across the full width of the boot, so that several support panels can be used and a division at any point of the boot is possible. The guide rail can be fixedly screwed directly to the boot floor, or can be detachable joined thereto by means of coupling elements arranged fixedly to the boot floor. The guide rail can be in the form of a profiled rail, in which or on which the sliding guide block is mounted.

The sliding guide block is preferably provided with a manually releasable locking catch so that in seconds the support panel can be displaced into any desired position and fixed there.

The support panel is rotatably hinged to the sliding guide block by way of an axle arranged in the region of and parallel to the lower longitudinal edge of the support panel, and is pivotable through at least 90°, preferably through 180°. In the horizontal position, the support panel lies flat on the floor of the boot and, in particular when several support panels arranged side by side are used, thus forms a stable and robust protective floor in the boot. The support panels can be provided on their wide sides with a "non-slip covering" and thus additionally prevent the loaded goods from sliding.

To divide the boot, the support panel is swivelled up into the vertical position in which it locks into a manually releasable locking mechanism arranged preferably on the sliding guide block. By displacing the sliding guide block, the support panel can be displaced into the desired position. This allows a smooth division of the boot into compartments of any desired size. When using several support panels, several compartments of individual sizes can be formed in this manner.

An especially simple operation is provided by the combination of the unlocking devices of the sliding guide block and support panel. In this manner the support panel can be folded over with a single hand action and displaced to the desired point. When not in use, the support panels can be folded down side by side flat on the boot floor or be pushed away in the vertical position towards the side wall of the boot and thus take up only a little space. Trouble-free and rapid access to the boot floor, for example, to remove the spare wheel, is also secured.

The guide rail is preferably arranged (in the direction of travel) behind the support panels. To increase stability, it would also be possible to mount the support panels in two guide rails arranged one at each end of the panel, or to mount them in a guide rail arranged between the front and rear ends. It would also be possible to install the device in the boot rotated through 90° so that the guide rail would be arranged parallel to and the support panel would be arranged transverse to the direction of travel.

The support panels can be provided on their wide sides with connecting elements, which enable different modules to be secured. These connecting elements are preferably arranged symmetrically on both wide sides of the support panels, and so that such modules can be fixed at any desired point of the support panel.

The connecting elements can be constructed, for example, as tongue and groove guides, which extend substantially for the entire length of the support panels so that the inserted modules can be displaced into any desired position. In this embodiment, the modules are provided with a manually releasably locking mechanism, by means of which they can be locked to the support panel in the desired position. Such modules can comprise a fixing module, by means of which, for example, tensioning ropes can be fastened to the support panel to secure the loaded goods. For that purpose the fixing module is to be provided with a suitable eye, and a fastening hook.

For example, the carrying handle of a shopping bag can be hooked onto a fixing module in the form of a fastening hook or a clip on a vertically positioned support panel, and thus can be safeguarded against tipping over.

Division of the boot in one axis, for example, transversely to the direction of travel, is possible with the support panels. An additional division in the second axis, for example in the direction of travel, is often also desirable, however. Depending on the division of the boot, however, the distance between the support panels varies so that an additional division in the second axis is only possible when this can be matched to the particular distance between the two support panels. For that purpose, belt modules are provided which can be non-positively connected to the connecting elements of the support panels and which are connected to one another by way of a roll-up belt. By means of the roll-up mechanism, the belt is automatically matched to the particular distance between the support panels and locks in that pulled-ut position by means of a manually releasable catch.

These belt modules can also be used to secure the loaded goods to a support panel. In that case, both modules are fastened to the same support panel (preferably on the same wide side) and the loaded goods have the belt tensioned over them. This is possible both in the horizontal and in the vertical position of the support panel. The width of the belt corresponds preferably approximately to the width of the support panels; the belt length is to be matched to the maximum distance of the support panels from one another and to the size of the loaded goods to be secured. The roll-up mechanism for the belt can be provided in one module or, in the case of longer belts, in both modules.

Besides the fixing modules and the belt modules, other modules, such as for example, open or closed containers, can of course be fixed to the support panels according to the same principle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
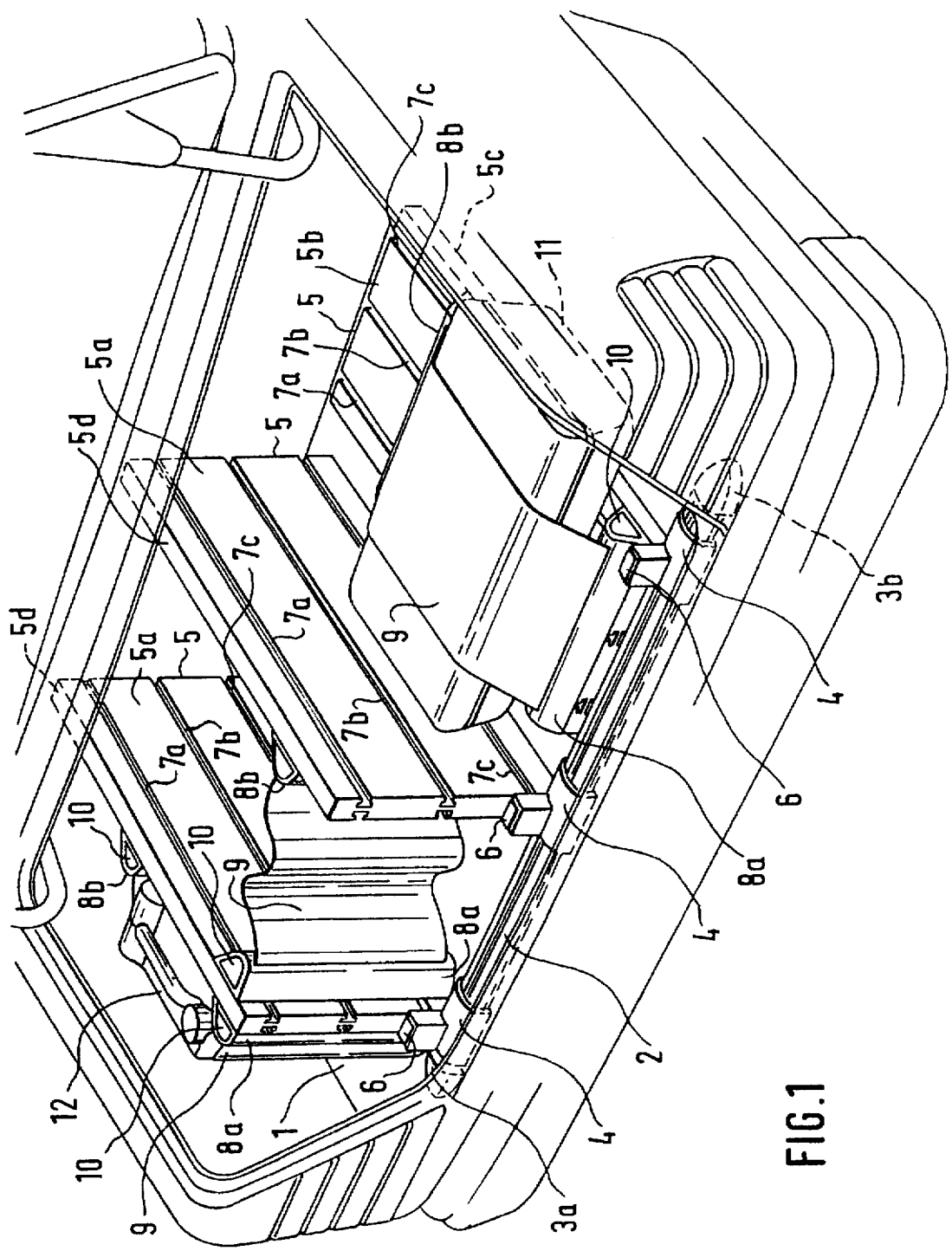
FIG. 1 shows, in a perspective view, the device built into the motor vehicle boot, with support panels in horizontal and vertical positions, and also belt modules in different applications.

FIG. 1 shows the device, installed in the motor vehicle boot, with two support panels 5 in a vertical position and one support panel 5 in the horizontal position.

The guide rail 2 is detachably secured by means of coupling elements 3a, 3b to the rear end of the boot floor 1 transversely to the direction of travel of the vehicle. The sliding guide blocks 4 are displaceably mounted on the guide rail 2.

The support panels 5 are rotatably hinged to the sliding guide blocks 4 and can be swivelled up from the horizontal position, in which they lie substantially parallel to the boot floor 1, into a position at right angles to the boot floor 1, in which position they are fixedly held by locking members 16a, 16b.

Unlocking devices 6 are arranged on the sliding guide blocks 4. Thereby the locking members 16a, 16b of the support panels 5 and at the same time the locking catches 17 for positioning the sliding guide blocks 4 on the guide rail 2 can be released.

On their wide sides 5a, 5b, the support panels 5 are provided with the connecting elements 7a, 7b, 7c in the form of tongue and grove guides. The connecting elements extend parallel to the horizontal end faces 5c, 5d over the entire length of the support panel 5.

The belt modules 8a, 8b, which are joined to one another by means of a pull-out belt 9, are fixed to the connecting elements 7a, 7b, 7c.

Push buttons 10 are arranged on the belt modules 8a, 8b, and, when operated, the locking members 30 of the belt modules 8a, 8b in the connecting elements 7a, 7b, 7c and at the same time the catches 32 which lock the belt 9 in the particular pulled-out position, are released. Thereby the belt modules 8a, 8b can be displaced on the support panel 5 and at the same time the belt 9 can be brought into the desired pulled-out position.

Using the belt modules 8a, 8b, on the one hand goods 11, 12 of different sizes to be transported can be secured to the horizontal support panels 5 and laterally to the vertical support panels 5. On the other hand additional divisions between the support panels 5 can be formed, which adapt automatically to the particular spacing of these support panels 5.

Figure 2:
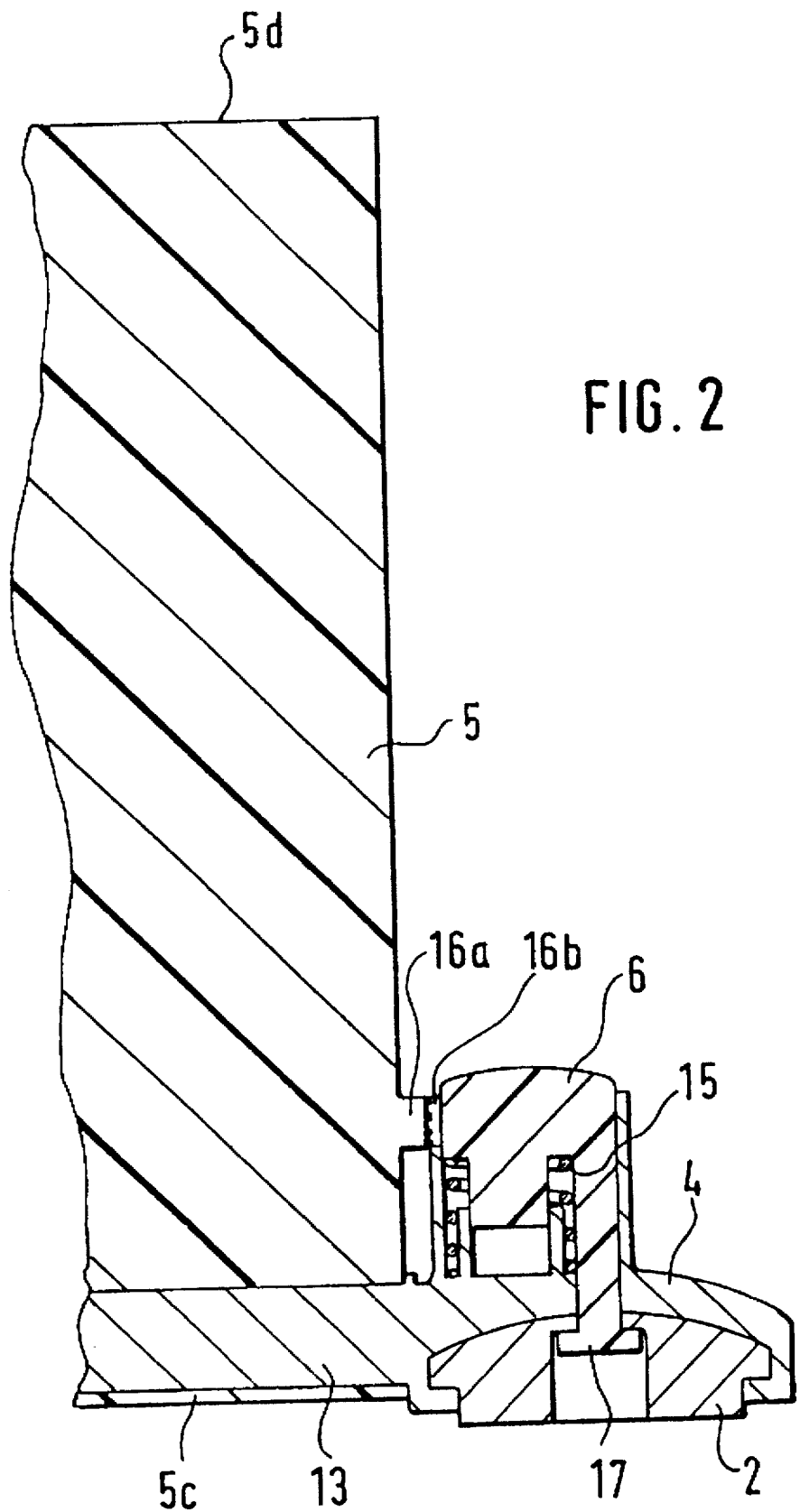
FIG. 2 is a longitudinal section of the device in the region of a support panel folded upright.

FIG. 2 shows the device in longitudinal section. The Support panel 5 set up in the vertical position is rotatably coupled, by way of the axle 13 arranged in the region of and parallel to its lower end face 5c, to the sliding guide block 4. The unlocking device 6, which can be pressed downwards against the force of the spring 15, is also arranged on the sliding guide block 4. When this occurs, the locking members 16a, 16b, which hold the support panel 5 in the vertical position, and at the same time the locking catch 17, by means of which the sliding guide block 4 is locked on the guide rail 2, are released. Thereby the support panel 5 can be folded down from the vertical into the horizontal position and can be displaced on the guide rail 2 into the desired position.

Figure 3:
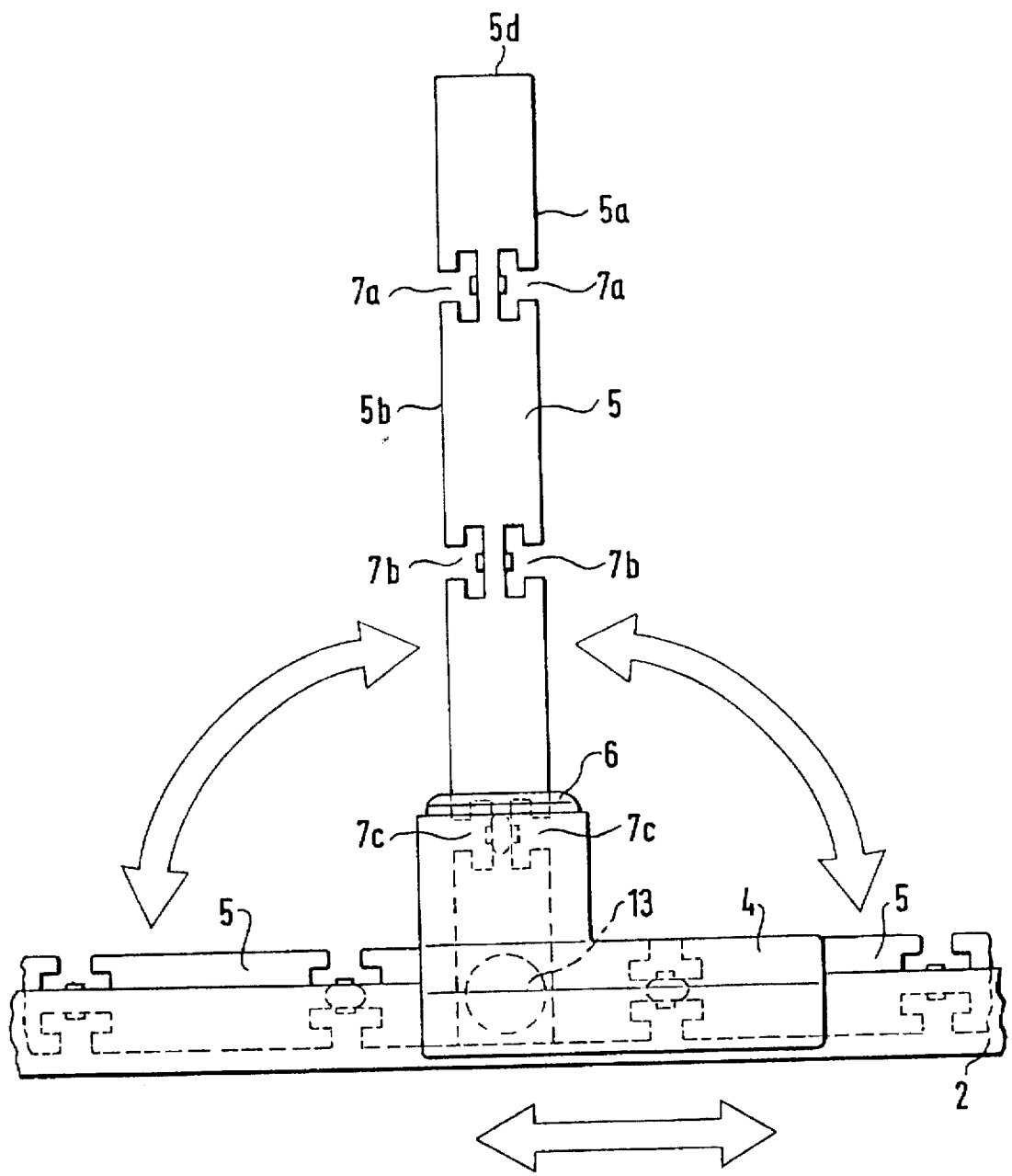
FIG. 3 is a front view of the device with the support panel in horizontal and vertical positions.

In FIG. 3, the support panel 5 is shown its two horizontal positions parallel to the boot floor 1 and in its upright position at right angles to the boot floor 1. The displacement direction of the sliding guide block 4 on the guide rail 2 is also shown.

Figure 4:
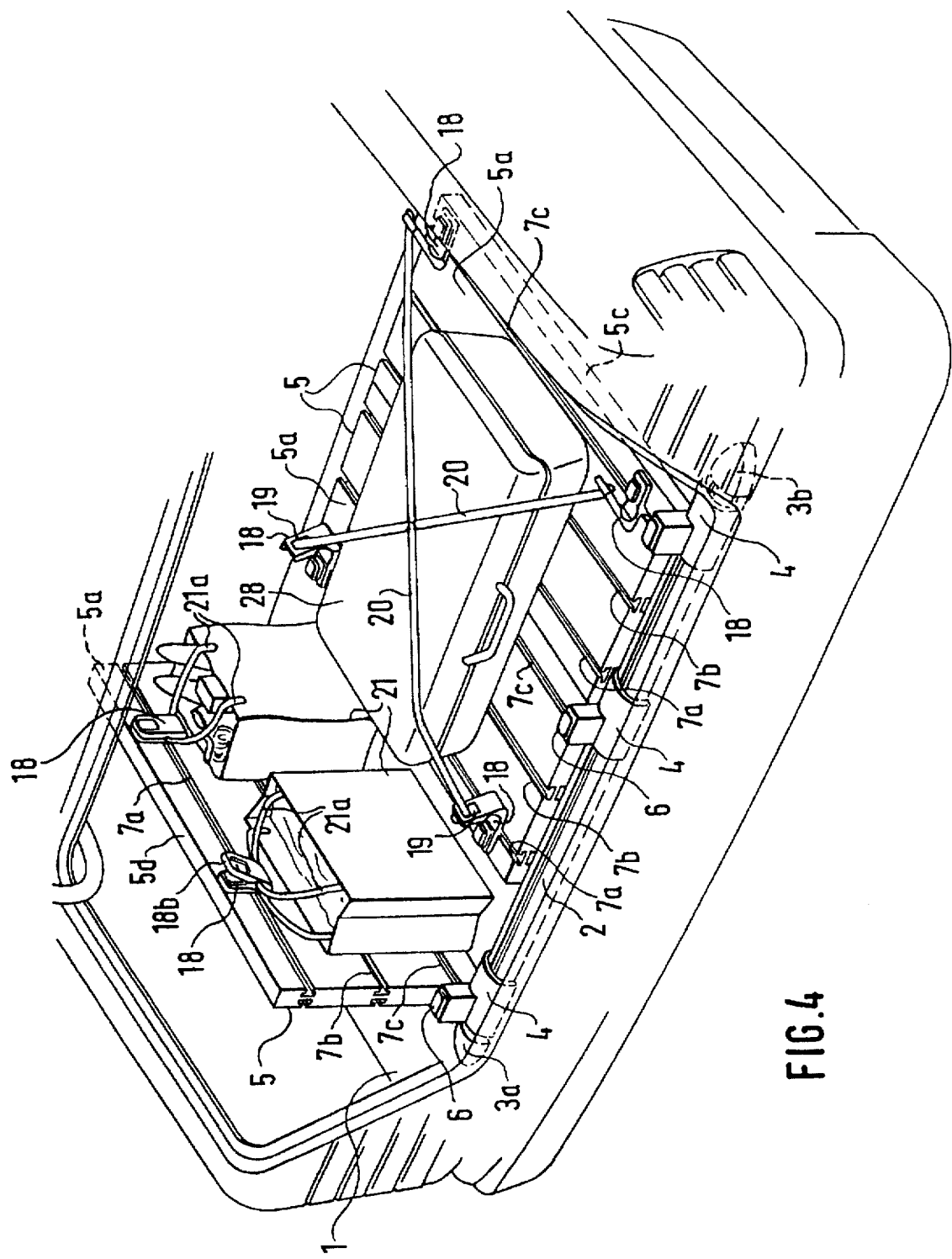
FIG. 4 shows, in a perspective view, the device installed in the motor vehicle boot with support panels in horizontal and vertical positions, and also fixing modules in different applications.

FIG. 4 shows the device installed in the motor vehicle boot with two support panels 5 in a horizontal position and one support panel 5 in the vertical position. Fixing modules 18 are mounted on the connecting elements 7a, 7b, 7c of the support panels 5. The fold-out parts 18b of the fixing modules 18 are provided with eyes 19 to which tensioning ropes 20 for securing the loaded goods 28 can be fastened.

When the fixing modules 18 are arranged on a vertically positioned support panel 5, the carrying handles 2a of a shopping bah 21 can also be hooked onto the fold-out part 18b. Therefore the bag is prevented from tipping over.

Figure 5:
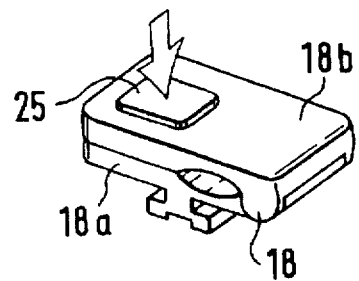
FIG. 5 is a perspective view of the closed fixing module.
Figure 6:
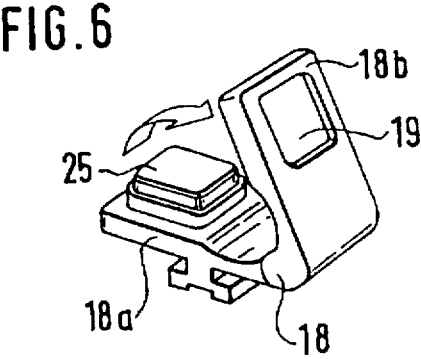
FIG. 6 is a perspective view of the opened-out fixing module.
Figure 7:
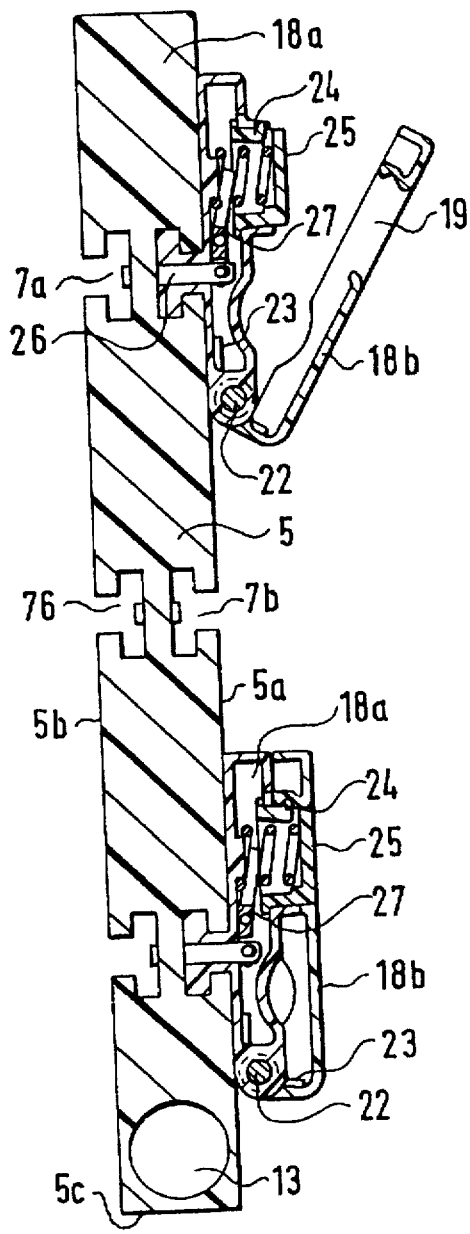
FIG. 7 is a cross-section through the support panel, with installed fixing modules in the closed and opened-out positions.

As FIGS. 5 to 7 show, the fold-out part 18b of the fixing module 18 is hinged to the fixing plate 18a by way of the axle 22. The closure hook 24, which secured the fold-out part 18b in the folded-in position against the force of the leg spring 23, is arranged on the fixing plate 18a. By operating the button 25, the closure hook 24 is displaced to such an extent that the fold-out part 18b is released and opens out under the effect of the force of the leg spring 23. As the button 25 is pressed, at the same time the deflecting lever 27 releases the locking mechanism 26, which locks the fixing module 18 to the connecting elements 7a, 7b, 7c in the desired position.

Figure 8:
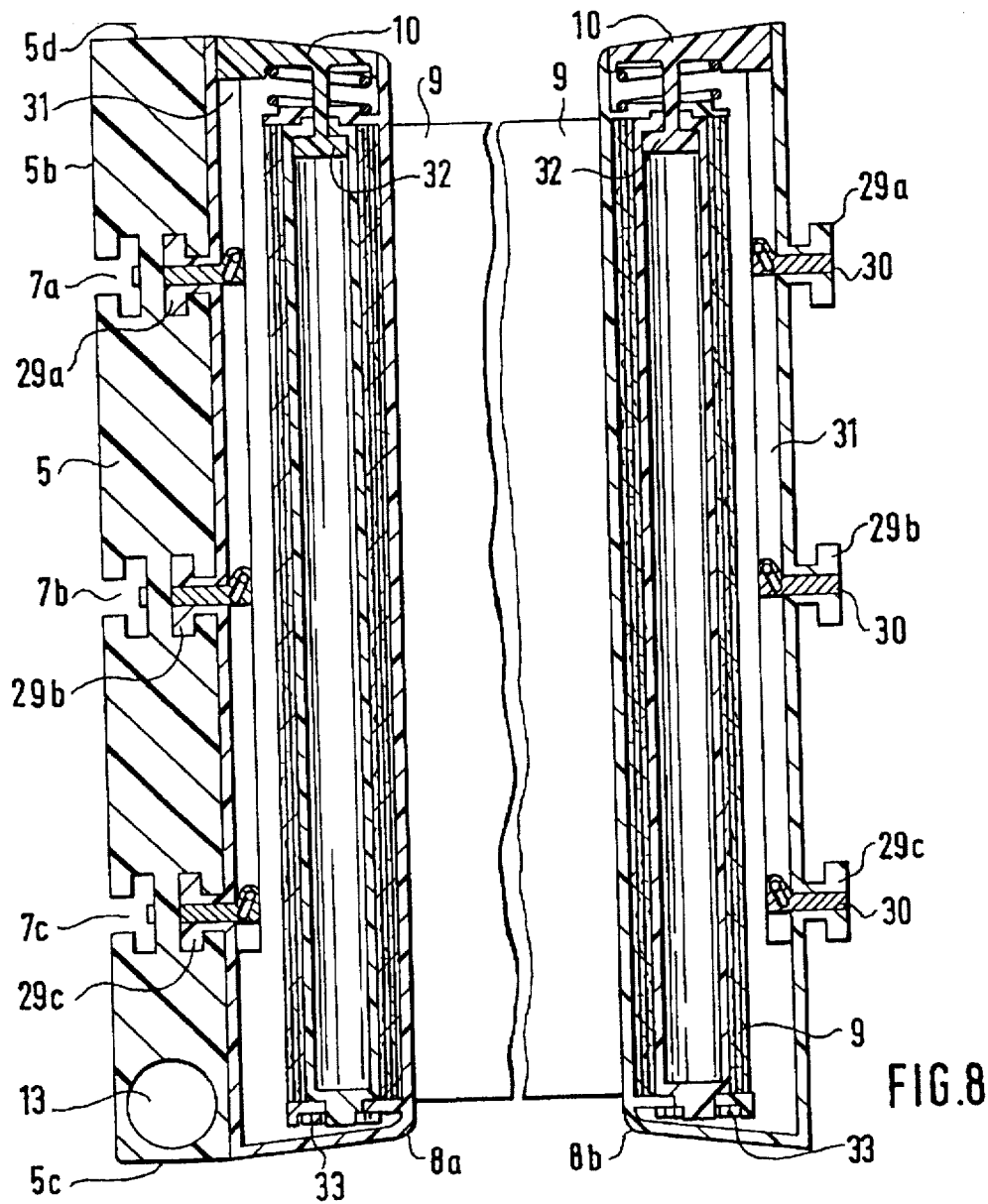
FIG. 8 shows two belt modules in longitudinal section, one of which s inserted in the support panel.
Figure 9:
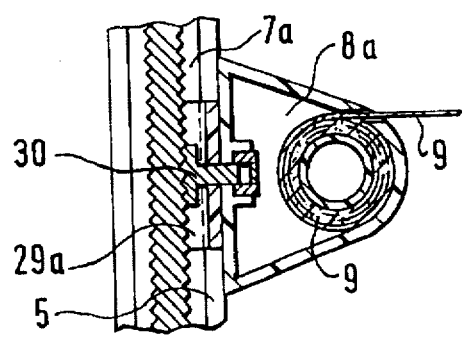
FIG. 9 is a cross-section through the belt module according to the illustration of FIG. 8 inserted in the support panel.

FIGS. 8 and 9 illustrate two belt modules 8a, 8b which are connected to one another by way of the belt 9. Arranged on the belt modules 8a, 8b are the fixing devices 29a, 29b, 29c, by means of which the belt modules 8a, 8b can be fixed to the connecting elements 7a, 7b, 7c. The fixing devices 29a, 29b, 29c contain locking mechanisms 30 which are disabled by the rail 31 when the push button 10 is operated. Therefore, the belt modules 8a, 8b can be displaced on the support panel 5 into the desired position. By operating the push button 10, the catch 32, which locks the belt 9 in its pulled-out positions against the force of the automatic roll-up device 33, and against pulling, is also released.

It will be understood that each of the elements described above, or two or more together, may also find a useful application in other types of constructions differing from the types described above.

While the invention has been illustrated and described as embodied in a device for variable division of motor vehicle boot and securing loaded goods, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for variable division of a motor vehicle boot and for securing loaded goods, the device comprising a guide rail arrangeable in a region of a boot floor; a sliding guide block; a support panel guided by said sliding guide block in said guide rail at right angles to said guide rail and so as to be transversely displaceable in said guide rail said support panel being mounted so as to rotate in said sliding guide block and being arranged to be swivelled up out of a horizontal position in which it lies substantially parallel to the boot floor into a position substantially vertical with respect to the boot floor; a locking member arranged on said sliding guide block under said support panel and securing said support panel in said vertical position relative to the floor boot to prevent a rotation of said support panel in said sliding guide block; a locking catch for locking said sliding guide block on said guide rail to prevent a displacement of said support panel in a longitudinal direction of said guide rail; and a common unlocking device releasing said locking member and said locking catch.

2. A device as defined in claim 1; and further comprising at least one additional support panel, said support panels being arranged side-by-side in said guide rail.

3. A device as defined in claim 1; and further comprising means for fixedly joining said guide rail to the boot floor.

4. A device as defined in claim 3, wherein said joining means include coupling elements which detachably join said guide rail to the boot floor.

5. A device as defined in claim 1; and further comprising at least one additional support panel, said support panels having wide sides provided with connecting elements.

6. A device as defined in claim 5, wherein said connecting elements are arranged symmetrically on both said wide sides.

7. A device as defined in claim 5, wherein said connecting elements are formed as tongue and groove guides which extend parallel to horizontal ends substantially for a length of said support panels.

8. A device as defined in claim 7; and further comprising modules connectable non-positively to said support panel by said connecting elements.

9. A device as defined in claim 8, wherein said modules are guided in said tongue and groove guides so as to be longitudinally displaceable and arranged to be locked; and further comprising manually releasable locking mechanisms for locking said modules.

10. A device as defined in claim 1; and further comprising additional means for dividing the boot transversely to said support panel.

11. A device as defined in claim 10; and further comprising at least one additional support panel, said additional means being arranged so as to be matched to a distance between said support panels.

12. A device for variable division of a motor vehicle boot and for securing loaded goods, the device comprising a guide rail arrangeable in a region of a boot floor; a sliding guide block; a support panel guided by said sliding guide block in said guide rail at right angles to said guide rail and so as to be transversely displaceable in said guide rail said support panel being mounted so as to rotate in said sliding guide block and being arranged to be swivelled up out of a horizontal position in which it lies substantially parallel to the boot floor into a position substantially vertical with respect to the boot floor, said support panel being pivotable in said sliding guide block through 180 degrees.

13. A device for variable division of a motor vehicle boot and for securing loaded goods, the device comprising a guide rail arrangeable in a region of a boot floor; a sliding guide block; a support panel guided by said sliding guide block in said guide rail at right angles to said guide rail and so as to be transversely displaceable in said guide rail said support panel being mounted so as to rotate in said sliding guide block and being arranged to be swivelled up out of a horizontal position in which it lies substantially parallel to the boot floor into a position substantially vertical with respect to the boot floor; additional means for dividing the boot transversely to said support panel; and at least one additional support panel, said additional support panel being arranged so as to be matched to a distance between said support panels, said additional means including belt modules connecting said support panels.

14. A device for variable division of a motor vehicle boot and for securing loaded goods, the device comprising a guide rail arrangeable in a region of a boot floor; a sliding guide block; a support panel guided by said sliding guide block in said guide rail at right angles to said guide rail and so as to be transversely displaceable in said guide rail, said support panel being mounted so as to rotate in said sliding guide block and being arranged to be swivelled up out of a horizontal position in which it lies substantially parallel to the boot floor into a position substantially vertical with respect to the boot floor, at least one additional support panel, said support panels having wide sides provided with connecting elements, said connecting elements being formed as tongue and groove guides which extend parallel to horizontal ends substantially for a length of said support panels; and modules connectable non-positively to said support panel by said connecting means, said modules being guided in said tongue and groove guides so as to be longitudinally displaceable and arranged to be locked; and further comprising manually releasable locking mechanisms for locking said modules.

15. A device as defined in claim 14, wherein said fixing module has a fold-out part which contains said eye and in a folded-out position forms said fastening hook.

16. A device for variable division of a motor vehicle boot and for securing loaded goods, the device comprising a guide rail arrangeable in a region of a boot floor; a sliding guide block; a support panel guided by said sliding guide block in said guide rail at right angles to said guide rail and so as to be transversely displaceable in said guide rail, said support panel being mounted so as to rotate in said sliding guide block and being arranged to be swivelled up out of a horizontal position in which it lies substantially parallel to the boot floor into a position substantially vertical with respect to the boot floor; at least one additional support panel, said support panels having wide sides provided with connecting elements, said connecting elements being formed as tongue and groove guides which extend parallel to horizontal ends substantially for a length of said support panels; and modules connectable non-positively to said support panel by said connecting element, said modules including a belt module with a pull-out belt.

17. A device as defined in claim 16; and further comprising a roll-up mechanism drawing said belt into said belt module.

18. A device as defined in claim 7; and further comprising a catch for locking said belt in a pull-out position.

19. A device as defined in claim 18; and further comprising means for manually releasing said catch.

20. A device as defined in claim 16, wherein said belt has an outer end provided with a fastening device joinable non-positively with said connecting elements.

21. A device as defined in claim 20, wherein said belt modules include two belt modules joined together by said belt.

22. A device as defined in claim 16, wherein said belt has a width substantially corresponding to a height of said support panel in an opened-out position.

* * * * *